March 2, 1937. T. H. JONES 2,072,209
MEANS FOR AND METHOD OF PRODUCING KNITTED FABRICS
Filed May 8, 1935 3 Sheets-Sheet 2
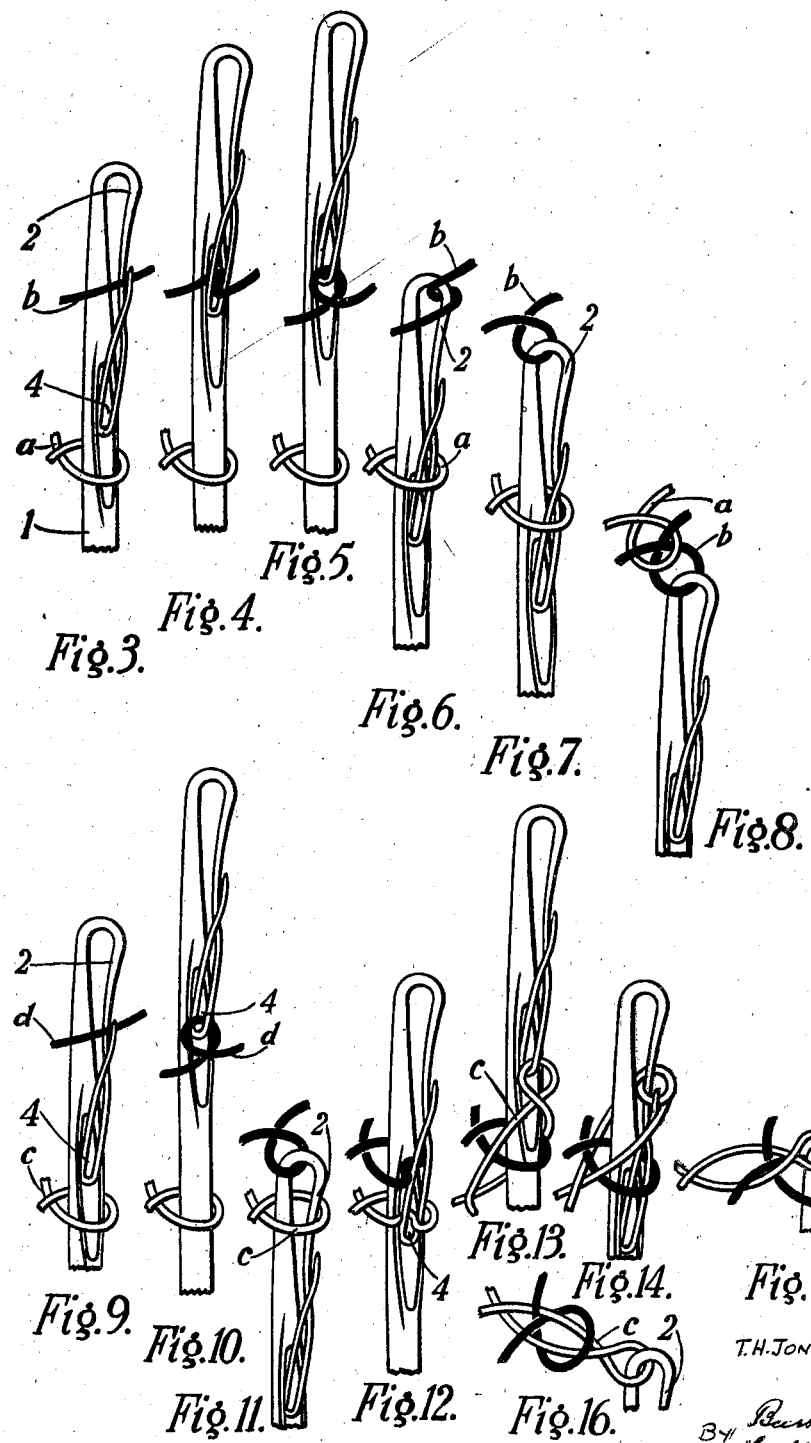
T. H. JONES
INVENTOR
ATTORNEYS.

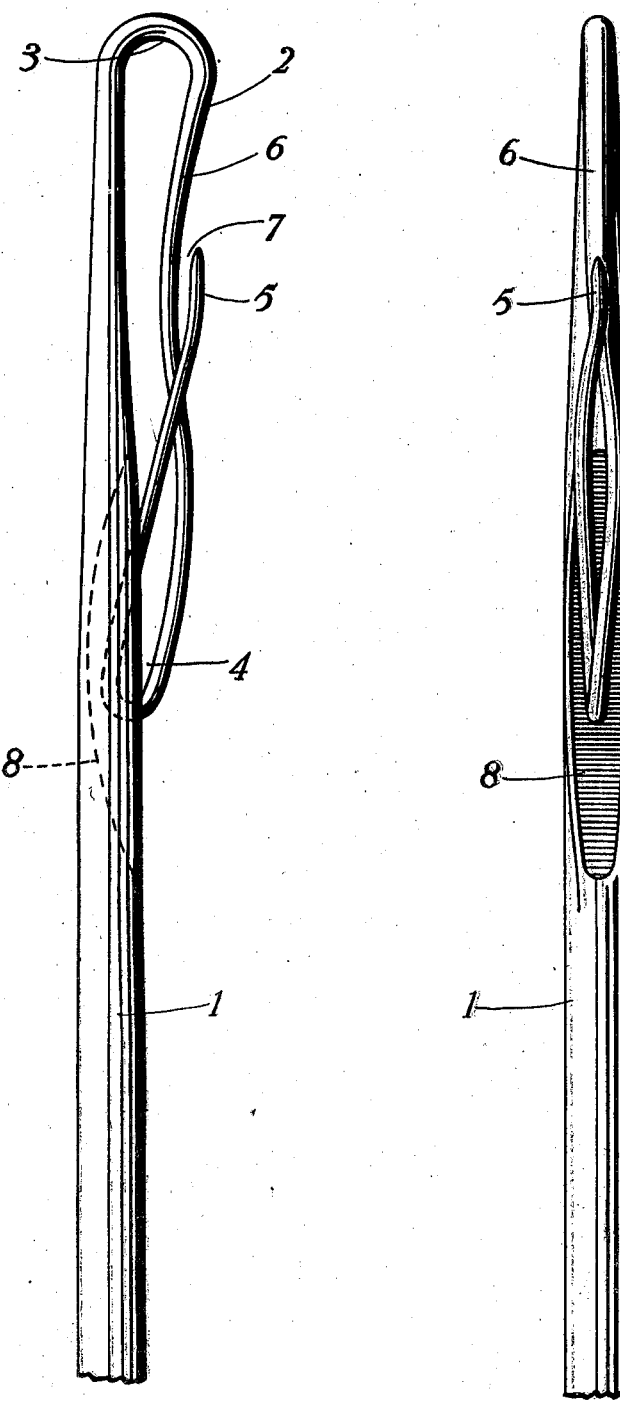

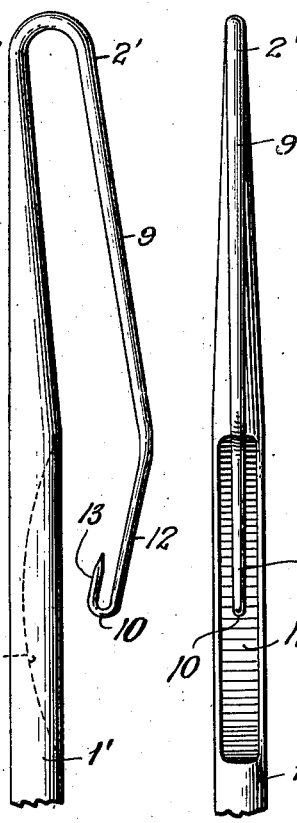

Patented Mar. 2, 1937

2,072,209

UNITED STATES PATENT OFFICE 2,072,209

MEANS FOR AND METHOD OF PRODUCING KNITTED FABRICS

Thomas Henry Jones, Woodthorpe, England

Application May 8, 1935, Serial No. 20,489
In Great Britain July 7, 1934

11 Claims. (Cl. 66—119)

This invention comprises improvements in the means for and method of producing knitted fabrics, the expression "knitted fabrics" including fabrics embodying knitted, crochet or similar intermeshing stitches. The main object of this invention is to provide a new type of knitting instrument by means of which the aforesaid stitches or variations thereof can be produced.

Broadly the present invention provides a knitting instrument, for example a needle, comprising a stem or shank having a hook which is extended to form a second hook. The double hook may be shaped to form what is virtually a helix, said helix being flattened or elongated and advantageously lying in approximately one plane or, if desired, in a plurality of closely disposed parallel planes. Preferably the helix of the hook is somewhat less than one complete turn and elongated in the direction of the length of the instrument, the major axis of the helix being perpendicular to the line of the instrument.

The terminating hook of the double hook portion or helix of the instrument may be shaped to form a complete loop, the free end of which is preferably extended beyond the area comprised in the loop.

In one particular construction the instrument comprises a needle, the shank or stem of which (assuming the needle to be disposed vertically with its stitch-forming end uppermost) has its upper end turned downwards to form a hook or crook the tail of which is bent towards the shank and upwards to form a complete loop, the free extremity of said loop projecting laterally from or beyond the loop to provide an element for receiving and guiding thread into the loop during stitch formation. Preferably, the length of said loop is substantially smaller than the length of the downward turned hook, say for example approximately half the length, and the said loop at some point or part either in its upward turned portion or in the lower bend thereof may bear resiliently upon or be disposed closely adjacent to the shank of the instrument and/or coact with or be normally partially accommodated within a groove, recess or slot in said shank or projecting part thereof.

In a modified construction the needle is provided with a hook or beard which has its free end or tail portion turned back towards the shank to form a comparatively small subsidiary hook, both hooks being normally open. In this needle, the main hook is adapted to be closed by pressing the subsidiary hook on to the needle stem or shank, and when so closed the main and subsidiary hooks advantageously combine to form a single closed loop or eye.

For the purpose of more fully describing the nature of this invention reference will now be made to the accompanying drawings, wherein:—

Figure 1 is a side elevational view of the needle according to one embodiment of this invention.

Figure 2 is a front elevational view of the same instrument.

Figures 3 to 8 illustrate six successive steps in the employment of the instrument for making a knitted stitch.

Figures 9 to 16 illustrate eight successive steps in the employment of the needle in producing a locked or tied stitch.

Figure 17 illustrates in side elevation a modified construction of needle in accordance with this invention.

Figure 18 is a front view of the modified needle.

Figures 19 to 21 show three successive steps in the production of an ordinary knitted stitch by the use of the needle shown in Figures 17 and 18.

Figures 22 to 28 illustrate seven successive steps in the production of a locked or tied knitted stitch by the employment of the needle shown in Figures 17 and 18.

The needle shown in Figs. 1 and 2 will now be described in detail.

The shank or stem 1 of the needle (which in the customary manner is adapted to be reciprocated in a needle bed trick, or is carried by a needle bar) is bent over at one end (e. g. its upper end) to form a main hook or crook 2. The metal of the hook may be of comparatively small cross section or gradually tapering cross section. Assuming the needle to be vertical, the hook 2 extends down from the top bend or bight 3 for a suitable distance and is then bent inwardly towards the shank 1 and upwardly to form a second hook 4. The second hook may be straight, curved or twisted and disposed in approximately the same plane as the first or main hook 1 or in a plane or within planes substantially parallel therewith, the backwardly or upwardly turned part of said second hook being inclined outwardly from the shank 1 to cross the downwardly depending portion of the main hook 2 and form a complete loop; said upturned part of the loop 4 being preferably maintained laterally spaced from the depending portion of the main hook, and the free end or tail 5 of the loop being bent or slightly cranked round the main hook on to the front or outer side thereof without bearing thereon. At the position where the free end 5 of the loop 4 intersects the downwardly depending part of the main hook 2, said last-named part is with advantage curved inwardly towards the needle shank as at 6, so that looking at the needle sideways (Fig. 1) an approximately V-shaped recess or space 7 is provided between the loop tail and the outer face of the depending portion of the main hook, which recess or space is adapted to have thread fed into it during stitch formation. Conveniently also the termination of the tail 5 is shaped to extend vertically or substantially vertically approximately parallel with the adjacent portion of the main hook. It is also desirable that the distance from the tip of the loop tail 5 to the back face of the needle shank 1 is not greater than the full width of the main hook at the top bend 3.

The metal of the combined hook and loop (hereinafter called the helix) is rendered springy, and the helix loop 4 may be caused to bear resiliently on the needle shank. Advantageously that part of the needle with which the helix loop coacts is recessed or slotted, as at 8, part of said loop 4 being normally accommodated within the recess or slot with the object of enabling a cleared stitch loop to pass up over the helix without entering the hook 2.

The particular formation of the helix may, however, be varied without departing from the scope of the invention.

One method of making a plain knitted stitch on an instrument as above will now be described with reference to Figs. 3 to 8. Assuming that a previously formed stitch loop $a$ is already on the needle, said old stitch loop is cleared below the helix by an upward movement or projection of the needle, and during said upward movement new thread $b$ is fed into the recess 7 between the projecting end 5 of the helix loop 4 and the outer face of the depending portion of the main hook 2 and caused to enter said helix loop 4 after which a downward movement or retraction of the needle causes said new thread to pass round said loop and up into the hook 2 of the helix, the new thread loop being twisted during this process. The downward movement of the needle also causes the old stitch loop $a$ to pass over the helix and new thread loop therein and to be cast off or knocked over the needle. The new twisted stitch loop $b$ thus formed is retained in the hook 2 of the helix and by subsequent operation of the needle to form another stitch is cleared down the shank at the back or inner side of the helix loop 4.

By varying and/or extending the sequence of operation stitches other than plain normal stitches may be produced, such for example as tuck stitches and locked stitches. The instrument before described is also capable of making a locked or tied stitch the non-ladder or non-running quality of which is considerably enhanced as compared with stitches previously known or proposed. This is in the main due to the fact that a thread loop in negotiating the helical or double-hook portion of the needle has imparted thereto a twist as aforesaid; consequently a stitch loop is embraced by a twisted locking loop, i. e. a closed or complete loop, the grip of which on the stitch progressively increases as lateral stretch is applied to fabric.

One method of making a locked or tied stitch by the use of the aforesaid instrument will now be described with reference to Figs. 9 to 16. An already formed stitch loop $c$ to be locked is cleared on to the needle shank below the helix and locking thread $d$ is fed into the V-shaped recess 7 (Fig. 9) between the projecting end 5 of the helix loop 4 and the outer face of the main hook 2, upward movement of the needle causing said locking thread to pass down into the helix loop (Fig. 10). The needle is now moved down or retracted and causes the locking thread $d$ to pass round the bight of the loop 4 and up into the main hook 2, the locking thread loop being twisted during this movement. During the downward movement of the needle the old stitch loop $c$ is passed up over the helix but not cast off (Fig. 11), and subsequent upward movement of the needle causes said old loop to be drawn down into the hooked end or bight of the loop 4 (Fig. 12) from which it is suspended, and the locking thread loop is traversed down the needle shank to a position immediately below the helix and is thereby threaded through the old stitch loop $c$ (Fig. 13). The needle is then again retracted or drawn down and the locking thread loop passes up over the outside of the helix (Figs. 14 and 15) and is knocked over or cast off around the old stitch loop $c$ which is still retained in the needle hook 2 (Fig. 16).

The modified construction of needle shown in Figs. 17 and 18 will now be described. Here the needle shank 1' has a hook 2' with spring beard 9 which terminates in a second comparatively small hook 10 formed by bending the tail end of the beard 9 inwardly towards the shank and backwardly. The shank 1 is slotted or recessed at 11, said slot being preferably formed in a thickened part of the shank and being adapted to accommodate the small hook 10 when the beard 9 is pressed. In this way a main hook 2' and a subsidiary hook 10 are provided, the bends or bights of the two hooks being opposed, and in the normal condition the smaller hook 10 is spaced from the inner face of the slotted shank 1'. Conveniently the beard 9 is slightly cranked or curved so that its lower part 12 (the free end) inclines towards the shank. The small hook 10 is of substantially U-shape and the upturned tail portion 13 of said hook preferably inclines outwardly from the shank, parallel or substantially parallel with the inclined end part 12 of the beard 9.

In making an ordinary knitted stitch by the use of this modified construction of needle (see Figs. 19 to 21) an old stitch loop $a$ is cleared on to the shank 1' below the double hook or beard by raising or projecting the needle in the usual way and new thread $b$ is fed beneath the beard 9 (Fig. 19) and passed up into the main hook 2' by downward movement or retraction of the needle, and during this movement the beard 9 is pressed so as to bury the small hook 10 in the slotted shank, and the old stitch loop $a$ is passed up over said beard (Fig. 20) and cast off or knocked over in the customary manner (Fig. 21).

A method of making a locked or tied stitch by the use of this modified construction of needle will now be described with reference to Figs. 22 to 28. Assuming the old stitch loop $c$ is already on the needle shank 1' and cleared well below the beard 9, locking thread $d$ is fed across the needle shank below the beard (Fig. 22) above said old loop $c$ and the needle is retracted or moved down so as to cause said locking thread $d$ to pass up into the bight of the main hook 2' and also to cause the old loop $c$ to pass within the beard to a position above the tail 13 of the small hook 10 (Fig. 23), the two thread loops being maintained separate one below the other. The beard 9 is now pressed to bury the tail of the small hook 10 in the shank and a short upward movement imparted to the needle to cause the old loop c to pass down into said small hook, (Fig. 24). The upward movement of the needle is now continued, and before the locking thread loop d reaches the tail 13 of the small hook 10 pressure is released from the beard 9 which thereby opens and the old loop c is pulled down into the bight of the subsidiary hook 10 and the locking thread loop d passes down between the tail 13 of said hook and shank 1 (Fig. 25) until said locking loop becomes threaded through the old loop c suspended in the subsidiary hook 10. The beard 9 is then again pressed to bury the hook 10 (Fig. 26) and the needle moved down so as to cause the locking loop d to pass over on to the outside of the needle beard (Fig. 27) after which the pressure on the beard is released and continued downward movement of the needle causes the locking loop to be cast off over and around the old loop c which is still retained on the needle (Fig. 28). It is to be understood that the resistance to closing of the needle beard is sufficiently strong to prevent same being closed by the action thereon of the thread loops. If, however, the tension on the loop c when in the small hook 10 is sufficient to pull the tail end of the beard 9 towards the needle shank, the outwardly diverging or inclined tail portion 13 of the small hook 10 permits of the locking loop d passing down between said tail 13 and the shank.

It will be appreciated that whereas by the use of the needle shown in Figs. 1 and 2 twisted thread loops are formed, the loops formed by the use of the needles shown in Figs. 17 and 18 are not twisted but are maintained as open loops.

It will also be appreciated that in using a needle in accordance with this invention said needle may be stationary and the stitch thread and/or the work may be caused by suitable means to move on said needle.

The needle hereinbefore described, and in particular the needle illustrated in Figs. 17 and 18, is especially applicable for use in a flat or straight bar knitting machine such as the well known Cottons machine. Sinkers or equivalent instruments may be employed for controlling the thread loops in their movements relatively to the needle.

I claim:—

1. A method of knitting with a needle having a shank and a spring beard which is extended and turned inwardly towards the shank to form a subsidiary hook which is shaped as a complete loop, characterized by the following sequence of operations, namely, clearing an already formed stitch loop on to the needle shank below the double hook, feeding new thread into the looped extension of the main hook, passing said thread around said looped extension and back into the bend or bight of the main hook and thereby forming a twisted loop of said new thread, and passing the old thread loop along the needle over the double hook and casting same off over said new loop.

2. A method of knitting with a needle having a shank and a spring beard which is extended and turned inwardly towards the shank to form a subsidiary hook which is shaped as a complete loop, characterized by the following sequence of operations namely, clearing an already formed stitch loop on to the needle shank below the double hook, feeding new thread into the looped extension of the main hook, passing said thread around said looped extension and back into the bend or bight of the main hook and thereby forming a twisted loop of said new thread, passing the old loop along the needle on to the main hook and back into the looped extension of said hook, passing the loop of new thread down the needle shank out of the double hook so as to cause same to project through the old loop suspended from the looped extension of the hook, passing said old loop round said looped extension and up into the bend of the main hook, thereby forming a twist in the thread loop, and finally casting off the new loop over said old loop.

3. A method of knitting with a needle having a shank and a spring beard which is extended and turned inwardly towards the shank to form a subsidiary hook, characterized by the following sequence of operations, namely, clearing an already made stitch loop on to the needle shank below the double hook, feeding new thread in between the tail of the subsidiary hook and the shank, passing said new thread into the main hook, closing said hook and finally knocking over the old loop.

4. A method of knitting with a needle having a shank and a spring beard which is extended and turned inwardly towards the shank to form a subsidiary hook, characterized by the following sequence of operations namely, clearing an existing stitch loop on to the needle shank below the double hook, feeding new thread between the tail of the subsidiary hook and the shank, passing said new thread to the closed end of the main hook, passing the old loop into said main hook, passing the old loop back over said tail into the subsidiary hook, passing the new thread back down the shank between said tail and shank so as to thread a loop of said new thread through the old loop, and finally passing said new loop over the main hook and casting same off the needle over or around said old loop which is retained in the hook.

5. A method of knitting with a needle having a shank and a spring beard which is extended and turned inwardly towards the shank to form a subsidiary hook, characterized by the following sequence of operations, namely, clearing an existing stitch loop on the needle below the double hook, feeding new thread into the main hook and passing same up into the bend or bight thereof, passing the old loop up into the main hook below the loop of new thread, maintaining the old and new loops separate, pressing the main hook, passing the old loop into the subsidiary hook, releasing the pressure on the main hook, passing the new thread loop down between the tail of the subsidiary hook and the needle shank and threading the new thread loop through the old loop, and finally again pressing the main hook and casting off or knocking over the new thread loop around the old loop which is retained in the needle.

6. A knitting needle comprising a stem or shank terminating in a spring beard which is extended and turned inwardly towards the shank to form a subsidiary hook, said shank having a slot or groove therein adjacent to the subsidiary hook and said subsidiary hook being adapted to coact with said slot or groove to permit of a cleared thread loop being passed over the beard from the shank.

7. A knitting needle comprising a stem or shank having a spring beard or hook extended to form a second or subsidiary hook which is shaped as a complete loop and over which beard with terminal loop a thread loop can be passed from the needle stem in the formation of a knitted stitch.

8. A knitting needle according to claim 7, wherein the subsidiary hook of the beard comprises a complete loop having its free end projecting beyond the area comprised by said loop and said projecting free end of the loop constitutes a means for guiding fed thread into said loop.

9. A knitting needle according to claim 7, wherein the subsidiary hook of the beard comprises a complete loop and said loop coacts with a slot, groove or recess in the needle shank.

10. A knitting needle comprising a stem or shank having a spring beard or hook which is extended and turned inwardly towards the stem to form a subsidiary hook and over which beard with subsidiary hook a loop can be slid from the needle shank in the formation of a knitted stitch, the beard being shaped as a helix.

11. A knitting needle comprising a stem or shank terminating in a spring beard which is extended and turned inwardly towards the shank to form a subsidiary hook and over which beard with subsidiary hook a thread loop can be slid from the needle shank in the formation of a knitted stitch, the subsidiary hook or part being adapted to be received in a recess or slot formed in a bulging or widened portion of the needle shank.

THOMAS HENRY JONES.